Patented June 24, 1930

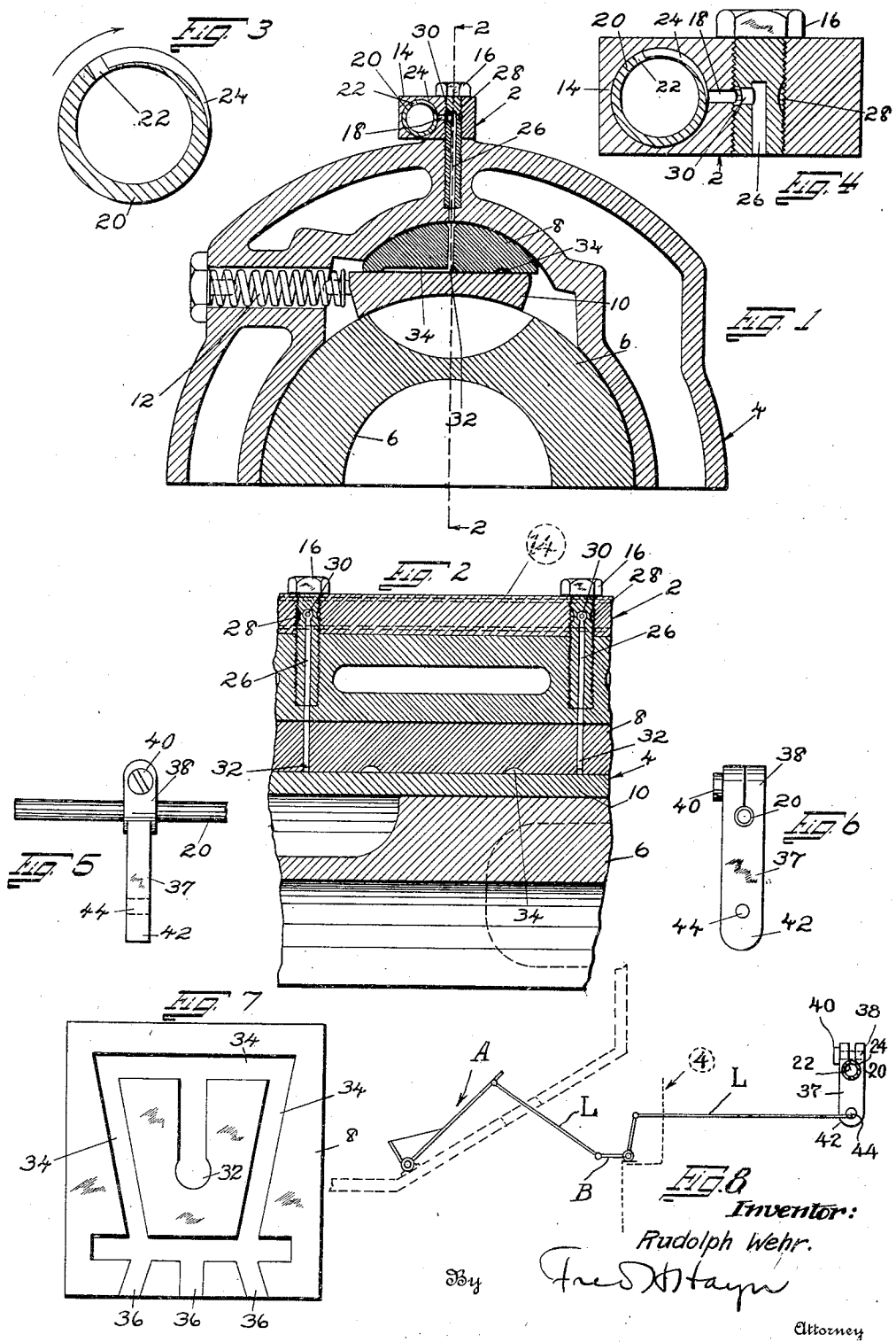

1,766,735

UNITED STATES PATENT OFFICE

RUDOLPH WEHR, OF LOS ANGELES, CALIFORNIA, ASSIGNOR TO THE WEHR MOTOR COMPANY, A CORPORATION OF CALIFORNIA

LUBRICATING SYSTEM

Application filed April 15, 1929. Serial No. 355,061.

My invention relates to lubricating systems for sliding surfaces, and more particularly to such systems adapted for special use in connection with internal combustion engines for the packing shoes associated with a rotary valve for such engines.

As is well known, when fuel is being introduced in an internal combustion engine, that is to say, when the throttle is opened, there is a lull in the degree of suction in said engine, at which time it is reduced to a minimum, and accordingly a means for introducing a lubricant into said engines, dependent upon the suction therein, will be least effective. It accordingly is an object of my invention to compensate for said lull, to insure that the packing means for the valve is continually and evenly lubricated at all times during the operation of the engine.

A further object of my invention is to provide a novel form of lubricating system in which a movable member, which may be actuated by the accelerator, or other means, is adapted to introduce a maximum of lubricant between the packing shoes associated with a rotary valve, one of the engaging surfaces of which is provided with a set of lubricating grooves for this purpose, the lubricant being preferably introduced into said grooves by means of one or more securing devices which may be in the form of a perforated and detachable bolt, said movable member being provided with means for introducing a variable amount of the lubricant into said grooves.

The above and further objects and advantages of my invention, as will hereinafter more fully appear, I attain by the construction described in the specification, and illustrated on the drawings, forming a part of my application.

Reference is had to the accompanying drawings, in which similar reference characters denote similar parts. In the drawings, Fig. 1 is a fragmentary transverse cross sectional view of an internal combustion engine equipped with my invention, Fig. 2 is a cross-sectional view, taken on the line 2—2, Fig. 1, Fig. 3 is an enlarged cross-sectional view taken through the movable member, illustrating the grooves for introducing a variable amount of lubricant into the engine, Fig. 4 is an enlarged transverse cross-sectional view taken through the lubricant casing, Figs. 5 and 6 are detail views of the movable lubricating tube operating means, Fig. 7 is an enlarged bottom plan view of one of the grooved packing members for the valve, and Fig. 8 is a more or less diagrammatic view illustrating how the accelerator of the motor vehicle may be used to actuate the lubricant introducing means.

Describing my invention more in detail, in its broader aspects, said invention comprises a lubricating system in which a pair of relatively sliding members is adapted to be lubricated by means of a set of grooves on the engaging surface of one of said members, means, in the shape of a perforated movable tube, operable at will, being provided for introducing a variable amount of lubricant in said grooves to insure that said members are at all times properly lubricated, even though the conditions of operation are varied, as for example when said invention is applied to an internal combustion engine, and the fuel is being introduced into said engine as the throttle is opened.

More specifically, my invention comprises a preferably elongated casing 2 positioned across the internal combustion engine 4, the valve 6 thereof having associated therewith a pair of relatively slidable packing shoes 8 and 10, continually urged in engagement by means of the adjustable spring means 12.

The casing 2 may be of elongated flat form, and also solid with the exception of the elongated bore 14, which is eccentrically positioned in said casing, a set of preferably detachable securing means or devices 16, of special construction, as hereinafter more fully described, being provided for securing the casing 2 to the engine 4. The casing 2 is provided with a set of perforations 18 in fluid connection with the bore 14, one for each of the devices 16.

In the bore 14 is positioned the tube or lubricant controlling means 20, perforated as at 22, to convey the lubricant to the perforations 18 in the casing 2, and co-extensive with each of said perforations 22, are the grooves 24 on the outer periphery of said tube, said grooves having their greatest depth at the holes 22, (see Fig. 3) and may extend substantially half of the circumference of said tube, each of said grooves being gradually reduced in depth from a maximum at the perforations 22 to nothing at their other ends for a purpose presently to be described.

The devices 16 are preferably formed in the shape of headed and screw-threaded bolts, which are provided with a central passage 26, and are grooved as at 28, and said grooves are perforated as at 30, so that the passage 26 may be at all times in fluid connection with the perforations 18 of the casing 2.

As seen in Figs. 1 and 2, I may make the devices 16 of any preferred length, the passages 26 therein aligning with passages 32 in the shoe 8, which passages are in fluid connection with the grooves 34 in the engaging surface of said shoe. The grooves 34 may be of any desired depth and width, and coextensive or not as preferred, and of any desired number and arrangement, and may have outlet branch grooves 36 discharging into the valve casing of the engine by the suction maintained therein, when the engine is in operation.

If desired, the devices 16 may extend a substantial distance with the casting to the top of the shoe 8, which may have its passage 32 outwardly flared at the top to insure the introduction of the lubricant therein.

When the valve 6 is open for the suction stroke of the engine, the valve casing 4 is at all points subjected to a depression caused thereby, since an exceedingly small clearance is at all times maintained about the valve 6, permitting said depression to extend to the grooves 36, (Fig. 7), the purpose of the packing shoes 8 and 10 being merely to hold the valve 6 in fluid tight relation with the valve casing between the inlet port of the cylinder and the inlet and exhaust ports. Since this clearance is so small, it has not been illustrated on the drawings.

The tube 20 is preferably oscillated by means of an operating member or lever 37, which has a split end 38, held together and on said tube by any preferred securing means, such as the screw bolt 40, the end 42 of the member 37 having a means, such as the hole 44, to which may be secured a means operated, for example, the accelerator A (Fig. 8), associated in any preferred way by the links L, the bell-crank B of which may be mounted at any convenient point on the casting 4, and the other end connected to the hole 44 of the member 37, so that the tube may be actuated simultaneously as the fuel is introduced into the engine or the throttle is opened. It will, of course, be understood that any preferred means may be provided for operating the tube 20. Moreover, any desired means may be connected with the tube 20 for introducing a lubricant therein, which lubricant is continually subjected to pressure conditions.

In operation, the lubricant is continually introduced into the grooves 34 by the suction maintained at all times within the valve casing by that in the engine which suction, as is well known, is reduced when the throttle is opened. To compensate for this lull, so that the grooves 34 will be continually supplied with lubricant, the tube is oscillated by the lever 37 so that a progressively larger portion of the grooves 24 will be presented to the holes 18 as the throttle is opened, thus insuring that the grooves 34 are at all times provided with said lubricant.

While I have thus described my invention with great particularity, it will be clear that the same may be modified throughout a wide range. I accordingly do not propose to be limited to the exact details of construction described and claimed, but reserve the right in practice to make any and all modifications that fall within the scope of the appended claims.

I claim as my invention:

1. In a lubricating system, a pair of relatively sliding members, one of which is provided on its engaging surface with a set of lubricating grooves, a lubricant conveying means, a lubricant introducing means for said grooves in fluid connection with said lubricant conveying means, and perforated and grooved oscillating means in said lubricant conveying means for controlling the flow of the lubricant to said grooves.

2. In a lubricating system, a pair of relatively sliding members, one of which has its engaging surface provided with a set of connecting lubricating grooves, a perforated casing provided with an elongated bore, a hollow perforated movable member in said bore, and a perforated hollow securing device extending through said casing and in fluid connection with said grooves and said casing, the periphery of said movable member being provided with means for introducing a variable amount of lubricant into said device and into said grooves when said movable member is moved.

3. In a lubricating system, a pair of relatively slidable members, one of which is provided on its engaging surface with sets of lubricating grooves, a perforated casing provided with an elongated bore, a hollow movable member in said casing provided with perforations, a set of hollow perforated securing devices extending into said casing, the perforations in said devices being in fluid connection with the perforations in said casing, said movable member being provided with means coextensive with the perforations in said movable member, for introducing a variable amount of lubricant into said devices and said sets of grooves when said movable member is moved, and means for moving said movable member at will.

4. In a lubricating system, a pair of relatively sliding members, at least one of which is provided on its engaging surface with a set of lubricating grooves, a perforated casing having an eccentrically positioned bore therein, a hollow perforated movable tube in said bore, hollow detachable means extending through said casing in fluid connection with said casing and said grooves, the periphery of said tube being provided with at least one groove of varying depth and coextensive with the perforations in said tube, and means for moving said tube at will.

5. A lubricating system for an internal combustion engine including a rotary valve and packing means for said valve, of means adapted to be operated by the accelerator for introducing a lubricant between said packing means.

6. A lubricating system for internal combustion engines including a rotary valve and grooved movable packing means therefor, of means adapted to be operated by the accelerator for introducing a lubricant into said grooves.

7. A lubricating system for internal combustion engines including a rotary valve and relatively movable packing shoes for said valve, the engaging surface of at least one of said shoes being provided with grooves, and means adapted to be operated by the accelerator for introducing a variable amount of lubricant into said grooves.

8. In a lubricating system for internal combustion engines including a rotary valve and relatively slidable packing means for said valve, of means associated with said packing means for introducing a variable amount of lubricant therebetween at will.

9. In a lubricating system for internal combustion engines including a rotary valve and relatively slidable packing shoes for said valve, of means associated with said shoes for continually introducing a lubricant between said shoes even when the suction in said engine is reduced to a minimum.

10. In a lubricating system for internal combustion engines including a rotary valve and packing means therefor, of means associated with said packing means for introducing a maximum amount of lubricant between said packing means when the throttle is opened.

In testimony whereof I have signed my name to this specification.

RUDOLPH WEHR.